(12) United States Patent
Yoon et al.

(10) Patent No.: US 11,928,171 B2
(45) Date of Patent: Mar. 12, 2024

(54) PROVIDING SHORTENED URL AND INFORMATION RELATED CONTENTS CORRESPONDING TO ORIGINAL URL

(71) Applicant: Hewlett-Packard Development Company, L.P., Spring, TX (US)

(72) Inventors: Ji Hyun Yoon, Seongnam-si (KR); Jung Nam Bae, Seongnam-si (KR); Yoon Soo Lee, Seongnam-si (KR); Chul Gee Lee, Seongnam-si (KR); Tae Soon Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/031,677

(22) PCT Filed: Sep. 20, 2021

(86) PCT No.: PCT/US2021/051117
§ 371 (c)(1),
(2) Date: Apr. 13, 2023

(87) PCT Pub. No.: WO2022/081306
PCT Pub. Date: Apr. 21, 2022

(65) Prior Publication Data
US 2023/0385358 A1    Nov. 30, 2023

(30) Foreign Application Priority Data
Oct. 16, 2020   (KR) .................. 10-2020-0134550

(51) Int. Cl.
*G06F 16/958*  (2019.01)
*G06F 16/955*  (2019.01)
(Continued)

(52) U.S. Cl.
CPC ......... *G06F 16/9566* (2019.01); *G06F 16/95* (2019.01); *G06F 16/958* (2019.01); *G06F 16/972* (2019.01); *H04N 1/00331* (2013.01)

(58) Field of Classification Search
CPC .. G06F 16/9566; G06F 16/958; G06F 16/957; G06F 16/9554; G06F 16/977;
(Continued)

(56) References Cited

U.S. PATENT DOCUMENTS

| | | |
|---|---|---|
| 5,870,767 A | 2/1999 | Kraft |
| 8,937,734 B2 | 1/2015 | Pesar |

(Continued)

FOREIGN PATENT DOCUMENTS

| | | | | |
|---|---|---|---|---|
| CA | 2927971 C | * | 7/2022 | ......... G06Q 30/0255 |
| JP | 2009-141772 A | | 6/2009 | |
| JP | 2015-076698 A | | 4/2015 | |

*Primary Examiner* — Khanh Q Dinh
(74) *Attorney, Agent, or Firm* — Brooks, Cameron & Huebsch, PLLC

(57) ABSTRACT

An example uniform resource locator (URL) information providing method includes obtaining a text from a document including location information and identifying the location information, transmitting an original URL corresponding to the identified location information to an external apparatus and receiving a shortened URL corresponding to the original URL, generating an optical recognition code corresponding to the received shortened URL and obtaining information related to a content provided from the original URL from the external apparatus based on the original URL, changing the document based on the shortened URL, the optical recognition code, and the information related to the content provided from the original URL, and generating the changed document as page description language data.

15 Claims, 21 Drawing Sheets

(51) Int. Cl.
*H04N 1/00* (2006.01)
*G06F 16/95* (2019.01)

(58) Field of Classification Search
CPC ...... G06F 16/986; G06F 16/95; G06F 16/951; H04N 1/00311
USPC ................ 709/220, 224, 225, 226, 228
See application file for complete search history.

(56) References Cited

U.S. PATENT DOCUMENTS

| | | | |
|---|---|---|---|
| 10,657,195 B2* | 5/2020 | Stone | H04L 67/146 |
| 2007/0128899 A1* | 6/2007 | Mayer | G06F 9/4406 |
| | | | 439/152 |
| 2008/0028307 A1 | 1/2008 | Oh | |
| 2009/0240598 A1* | 9/2009 | Kargman | G06Q 30/0633 |
| | | | 705/40 |
| 2017/0180378 A1 | 6/2017 | Tyler et al. | |
| 2018/0253502 A1* | 9/2018 | Stone | H04L 67/146 |
| 2018/0350180 A1* | 12/2018 | Onischuk | G07C 13/00 |
| 2021/0279776 A1* | 9/2021 | Boerner | G06K 19/06037 |

\* cited by examiner

PROVIDING SHORTENED URL AND INFORMATION RELATED CONTENTS CORRESPONDING TO ORIGINAL URL

BACKGROUND

An image forming apparatus may refer to an apparatus which prints print data generated on a terminal apparatus such as a computer on a printing medium such as paper. Examples of such an image forming apparatus include a copier, a printer, a facsimile, a scanner, a multi-function peripheral (MFP) serving functions of these in combination as one apparatus, and the like.

DETAILED DESCRIPTION

Figure 1:
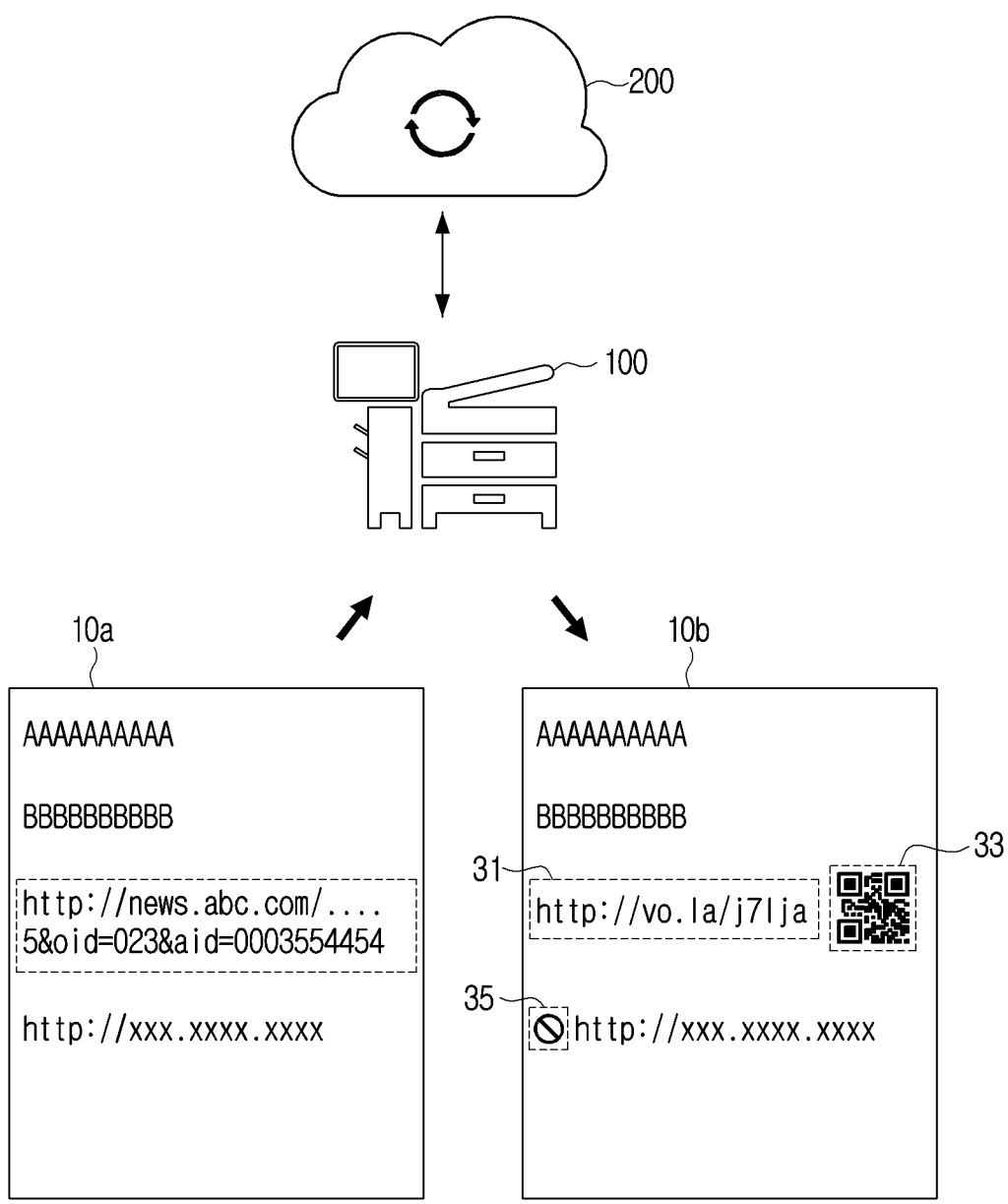
FIG. 1 is a diagram illustrating an electronic apparatus for providing uniform resource locator (URL) information according to an example.

Hereinafter, various examples will be described with reference to the drawings. The examples described hereinafter may be modified and practiced in various different aspects.

In the disclosure, the expression that a certain component is "connected" to another component not only includes a case where the components are "directly connected to each other," but also a case where the components are "connected to each other with another component interposed therebetween." In addition, when a certain component "includes" another certain component, it implies that a still another component may be further included, rather than excluding it, unless otherwise noted. Each of the described examples may be implemented or operated independently or the examples may also be implemented or operated in combination.

In the disclosure, an "image forming job" may refer to any of various jobs relating to an image such as forming of an image or generating, saving, or transmitting of an image file (e.g., copying, printing, scanning, or faxing), and the "job" may not only refer to the image forming job, but also refer to any process necessary for performing the image forming job.

The term "print data" may refer to data converted into a format that is printable from a printer. If a printer supports direct printing, a file itself may be the print data.

An "image forming apparatus" may refer to an apparatus that may print print data generated on a terminal apparatus such as a computer on a recording medium such as paper. Examples of such an image forming apparatus may include a copier, a printer, a facsimile, a scanner, and a multi-function peripheral (MFP) realizing functions of these as one apparatus in combination.

A "terminal apparatus" may refer to an apparatus that may edit or store documents and recognize characters from a document. The terminal apparatus may transmit print data to an image forming apparatus. Examples of a terminal apparatus may include a personal computer (PC), a laptop, a tablet PC, a smartphone, and the like.

An "external apparatus" may refer to an apparatus that may provide information or a service to an image forming apparatus or a terminal apparatus via a network. For example, the external apparatus may be a server, a cloud, a web server, a host apparatus, or the like. The external apparatus may provide a service from one physical device or may provide a service from a virtual apparatus separated from the one physical apparatus. In the specification, a plurality of external apparatuses may be included.

A "user" may refer to a person who performs a manipulation with respect to an image forming apparatus or a terminal apparatus.

A "uniform resource locator (URL)" may refer to an address where data or information is located in the Internet. An "original URL" may refer to a formal address where data is located and a "shortened URL" may refer to a URL obtained by shortening the original URL.

A document may include various pieces of information. Particularly, a large amount of data may be on a web page based on the development of communication technologies. Accordingly, a document may include information in a form of a URL, which is location information of data, instead of content of the data. If the URL is included in a printed document or a document that is not able to be copied, a user may input the URL to a web browser by himself or herself. However, since a length of the URL may be long, it is an inconvenience for the user to directly input the URL.

Therefore, examples of the disclosure provide an apparatus and a method for shortening a URL and providing information related to data (content) located at the URL.

FIG. 1 is a diagram illustrating an image forming apparatus for providing URL information according to an example.

Referring to FIG. 1, an electronic apparatus 100 is illustrated. The electronic apparatus 100 may be, for example, an image forming apparatus. The image forming apparatus may receive an original document 10a and generate a print document 10b. In an example, the image forming apparatus 100 may generate the print document 10b by processing URL information included in the original document 10a.

In an example, the original document 10a including a URL may be provided to the image forming apparatus 100. In the example of FIG. 1, a formal URL such as "http://news.abc.com/.5&oid=023% aid=0003554454" included in the original document 10a may be referred to as an original URL. The URL may include information regarding a location on the web where data may be located. The image forming apparatus 100 may scan the original document 10a and extract characters from scan data by using optical character recognition (OCR). The image forming apparatus 100 may identify the original URL from the extracted character. In an example, the original URL may include coordinate information on a map. The image forming apparatus 100 may recognize that information included in the original URL is map information from the coordinate information included in the original URL, when identifying the original URL.

The image forming apparatus 100 may generate a shortened URL 31 from the original URL. In an example, the image forming apparatus 100 may include an application for generating the shortened URL 31 and may generate the shortened URL 31 by using the shortened URL generation application. For example, referring to FIG. 1, the image forming apparatus 100 may transmit the original URL "http://news.abc.com/.5&oid=023% aid=0003554454" to an external apparatus 200. The external apparatus 200 may include an application for generating the shortened URL and may generate the shortened URL 31 "http://vo.la.j7lja" corresponding to the received original URL. The external apparatus 200 may transmit the generated shortened URL 31 to the image forming apparatus 100.

In an example, the shortened URL 31 may have a set valid period. For example, if a valid period of 7 days is set for the shortened URL 31, the user may access a web page linked to the original URL by using the shortened URL 31 for 7 days. However, after 7 days, the user may not access the web page linked to the original URL by using the shortened URL 31. In other words, the user may access the web page linked to the original URL by using the shortened URL 31 only during the valid period of the shortened URL 31.

The image forming apparatus 100 may generate an optical recognition code 33 corresponding to the shortened URL. For example, the optical recognition code 33 may include a barcode or a quick response (QR) code. Accordingly, the user may access the web page linked to the original URL by using the optical recognition code 33, without directly inputting the shortened URL 31 on the web browser. The optical recognition code 33 may also have the valid period set in the same manner as for the shortened URL 31. For example, if a certain valid period is set for the shortened URL 31, the image forming apparatus 100 may also set the same valid period for the optical recognition code 33.

The image forming apparatus 100 may obtain information 35 related to a content provided from the original URL from the external apparatus 200 based on the original URL. The external apparatus 200, from which the image forming apparatus 100 obtains information 35 related to a content, may be the same apparatus as the external apparatus for generating the shortened URL 31 or may be a different apparatus. The apparatus for generating the shortened URL 31 and the apparatus for transmitting the information related to the content are apparatuses separate from positioned outside of the image forming apparatus 100, and thus these may be collectively referred to as the external apparatus.

For example, referring to FIG. 1, if the content provided from the original URL contains harmful information, the image forming apparatus 100 may obtain the harmful information. If the content provided from the original URL is map information, the image forming apparatus 100 may obtain a map image containing location information. If the content provided from the original URL is image information, the image forming apparatus 100 may obtain a thumbnail image of the image information. If it is not able to access the original URL, the image forming apparatus 100 may obtain access failure information. The image forming apparatus 100 may change print data of the original document 10a so as to contain the generated shortened URL, the generated optical recognition code, and information related to the content provided from the original URL. In addition, the image forming apparatus 100 may generate the changed print data as a page description language (PDL) data and perform an image forming job based on the generated PDL data.

For example, referring to FIG. 1, the image forming apparatus 100, for which the original document 10a is provided, may generate the print document 10b containing the shortened URL 31 and the information related to the content through a series of processes described above. The print document 10b may contain the shortened URL 31, the optical recognition code 33, and the information 35 related to the content.

FIG. 1 illustrates an example in which the user provides the original document 10a to the image forming apparatus 100 to perform the image forming job. However, the user may perform the process of changing the URL contained in the original document on the terminal apparatus and transmit the print data to the image forming apparatus 100.

Figure 2:
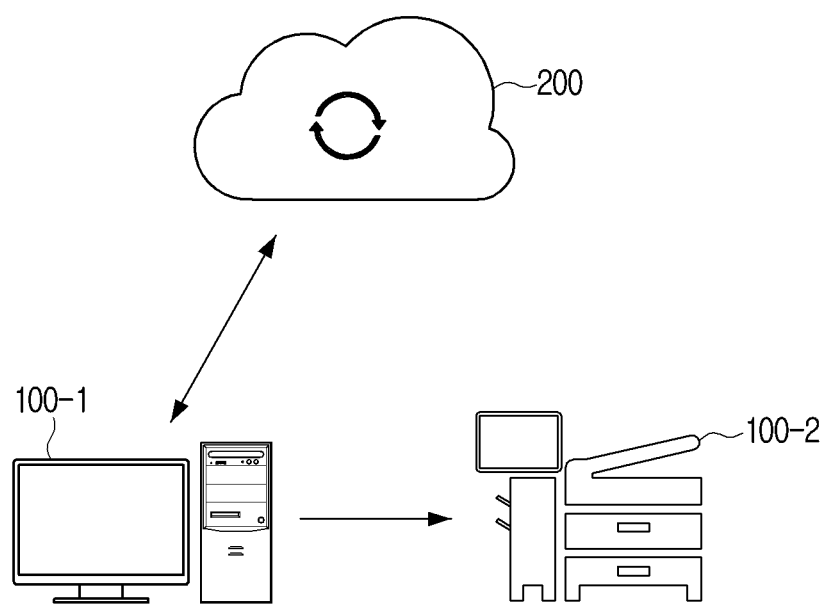
FIG. 2 is a diagram illustrating a URL information providing system according to an example.

FIG. 2 is a diagram illustrating a URL information providing system according to an example.

Referring to FIG. 2, the URL information providing system may include a terminal apparatus 100-1 and an image forming apparatus 100-2. The terminal apparatus 100-1 may generate an original document or receive an original document from an external electronic apparatus. For example, the document may include a document in a format in which characters are recognizable or a document in a format in which characters are not recognizable. If the characters of the original document are recognized, the user may copy a URL from the original document and input the URL on a web browser to access a web page linked to the URL. Accordingly, the original document illustrated in FIG. 2 may be the original document in a format in which characters are not recognizable.

The terminal apparatus 100-1 may extract characters from the original document by using an OCR technology. The terminal apparatus 100-1 may identify the original URL from the extracted characters. The terminal apparatus 100-1 may transmit the original URL to the external apparatus 200. The external apparatus 200 may include an application for generating a shortened URL and may generate a shortened URL based on the original URL received from the terminal apparatus 100-1. The external apparatus 200 may transmit the generated shortened URL to the terminal apparatus 100-1.

The terminal apparatus 100-1 may generate an optical recognition code corresponding to the shortened URL. In addition, the terminal apparatus 100-1 may obtain the information related to the content provided from the original URL from the external apparatus 200 based on the original URL. In an example, the information related to the content may include harmful information of a content, a map image, a thumbnail image of image information, access failure information, and the like provided from the original URL. The external apparatus 200, from which the terminal apparatus 100-1 obtains the information related to the content, may be the same apparatus as the external apparatus for generating the shortened URL or may be a different apparatus. The apparatus for generating the shortened URL and the apparatus for transmitting the information related to the content are apparatuses separate from positioned outside of the terminal apparatus 100-1, and thus these may be collectively referred to as the external apparatus.

The terminal apparatus 100-1 may change the print data of the original document so as to contain the generated shortened URL, the generated optical recognition code, and the information related to the content provided from the original URL. In addition, the terminal apparatus 100-1 may generate the changed print data as the PDL data and transmit the data to the image forming apparatus 100-2. The image forming apparatus 100-2 may generate the print document based on the received PDL data. As described above with reference to FIG. 1, the print document may include the shortened URL, the optical recognition code, the information related to the content, and the like.

Hereinabove, an example process of recognizing the URL included in the original document and generating the print data obtained by changing the original document by the image forming apparatus or the terminal apparatus has been described. Hereinafter, an example URL information providing method will be described.

Figure 3:
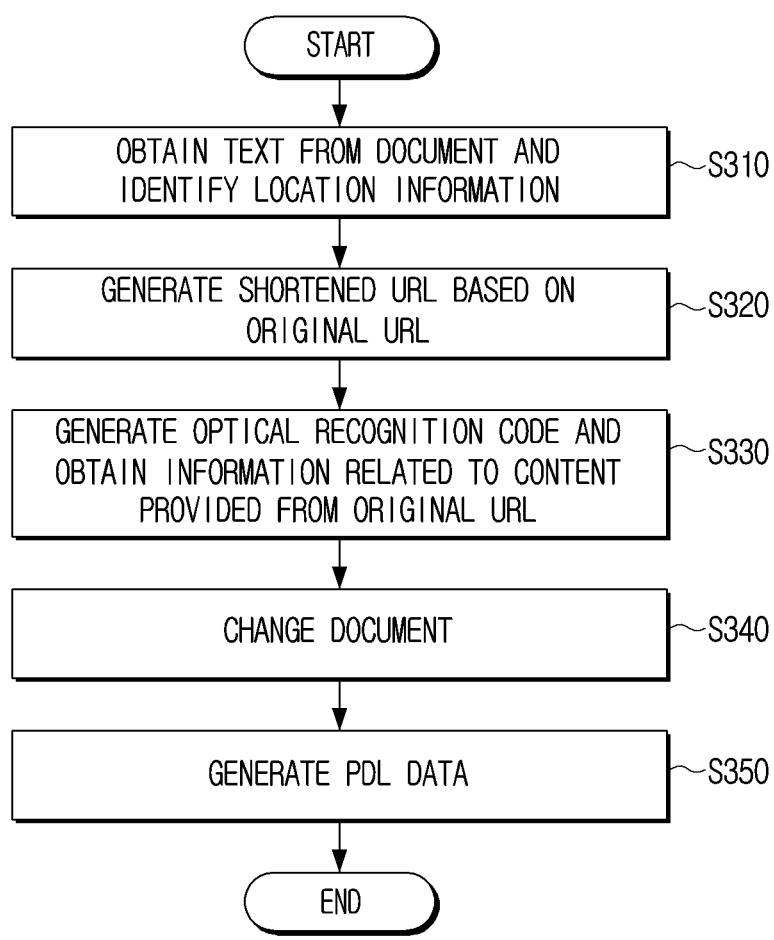
FIG. 3 is a diagram illustrating a flowchart of a URL information providing method according to an example.

FIG. 3 is a diagram illustrating a flowchart of a URL information providing method according to an example.

Referring to FIG. 3, the image forming apparatus may obtain a text from the original document and identify location information in operation S310. For example, the location information may be location information of a web page where the data is located. The location information of the web page may be a URL. Alternatively, if the URL contains coordinate information on a map, the location information may be coordinate information. In an example, the original document may be a document printed on a paper. In this case, the image forming apparatus may obtain a text from the original document by using the OCR technology.

The image forming apparatus may transmit an original URL corresponding to the identified location information to the external apparatus and receive a shortened URL corresponding to the original URL from the external apparatus in operation S320. The shortened URL may have a set valid period for connection (or access).

The image forming apparatus may generate an optical recognition code corresponding to the generated shortened URL, and obtain information related to a content provided from the original URL from the external apparatus based on the original URL in operation S330. For example, the optical recognition code may include a barcode, a QR code, or the like. The image forming apparatus may access the web page based on the original URL. If the original URL is linked to map information, the image forming apparatus may obtain a map image including location information based on coordinate information on a map. If the original URL is linked to image information, the image forming apparatus may obtain a thumbnail image of the image information. If a web page of the original URL contains harmful information, the image forming apparatus may obtain the harmful information. If it is not able to access the original URL, the image forming apparatus may obtain access failure information.

The image forming apparatus may change the original document based on the shortened URL, the optical recognition code, and the information related to the content provided from the original URL in operation S340. The image forming apparatus may change the original URL to the shortened URL. The image forming apparatus may dispose the optical recognition code or the obtained information related to the content in an area adjacent to the shortened URL. In an example, the image forming apparatus may add another page including the shortened URL, the optical recognition code, or the obtained information related to the content to the original document.

The image forming apparatus may generate the changed document as the PDL data in operation S350. The image forming apparatus may transfer the generated PDL data as an element for performing the image forming job. In addition, the image forming apparatus may perform the image forming job based on the generated PDL data.

An example in which the URL information providing method described above is performed on the image forming apparatus has been described above. As described above, an example URL information providing method may be performed on a system including the terminal apparatus and the image forming apparatus. For example, the terminal apparatus may obtain a text from the original document and identify the location information. In an example, the original document may be a document formed in a format in which editing or copying is not able to be performed. In this case, the terminal apparatus may obtain a text from the original document by using the OCR technology.

The terminal apparatus may transmit the original URL corresponding to the identified location information to the external apparatus and receive a generated shortened URL from the external apparatus.

The terminal apparatus may generate an optical recognition code corresponding to the generated shortened URL, and obtain information related to a content provided from the original URL from the external apparatus based on the original URL. The terminal apparatus may change the original document based on the shortened URL, the optical recognition code, and the information related to the content provided from the original URL. The terminal apparatus may generate the changed document as the PDL data. The terminal apparatus may transmit the generated PDL data to the image forming apparatus. In addition, the image forming apparatus may perform the image forming job based on the received PDL data.

Hereinabove, an example URL information providing method performed on an image forming apparatus or a terminal apparatus has been described. Hereinafter, an example of changing an original URL to a shortened URL and obtaining information related to the content will be described.

Figure 4A:
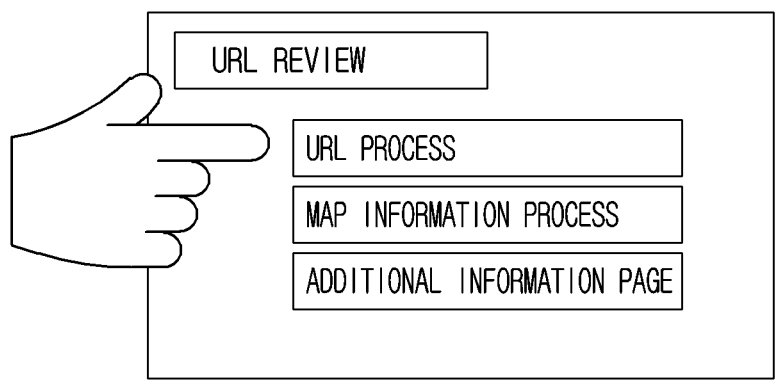
FIG. 4A is a diagram illustrating a user interface (UI) for processing a URL according to an example.
Figure 4B:
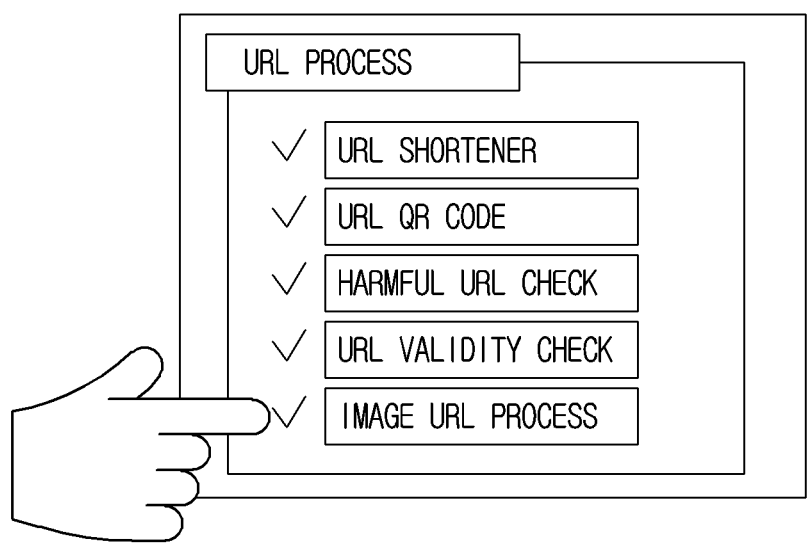
FIG. 4B is a diagram illustrating items in a URL process category according to an example.

FIG. 4A is a diagram illustrating a UI for processing a URL according to an example, and FIG. 4B is a diagram illustrating items in a URL process category according to an example.

Referring to FIGS. 4A and 4B, an image forming apparatus may display a UI for processing a URL. The UI for processing the URL may include a URL process category, a map information process category, an additional information page category, and the like. Hereinafter, an example of the image forming apparatus will be described. However, a terminal apparatus may also display the UI for processing the URL and perform the same URL processing process in the same or similar manner as in the image forming apparatus.

The URL process category may be selected on the image forming apparatus by a user's command. Referring to FIG. 4B, as an example, the URL process category may include a URL shortener item, a URL optical recognition code item, a harmful URL check item, a URL validity check item, and an image URL process item. At least one item may be selected on the image forming apparatus according to a user's command. The image forming apparatus may perform an operation corresponding to the selected item.

Figure 5A:
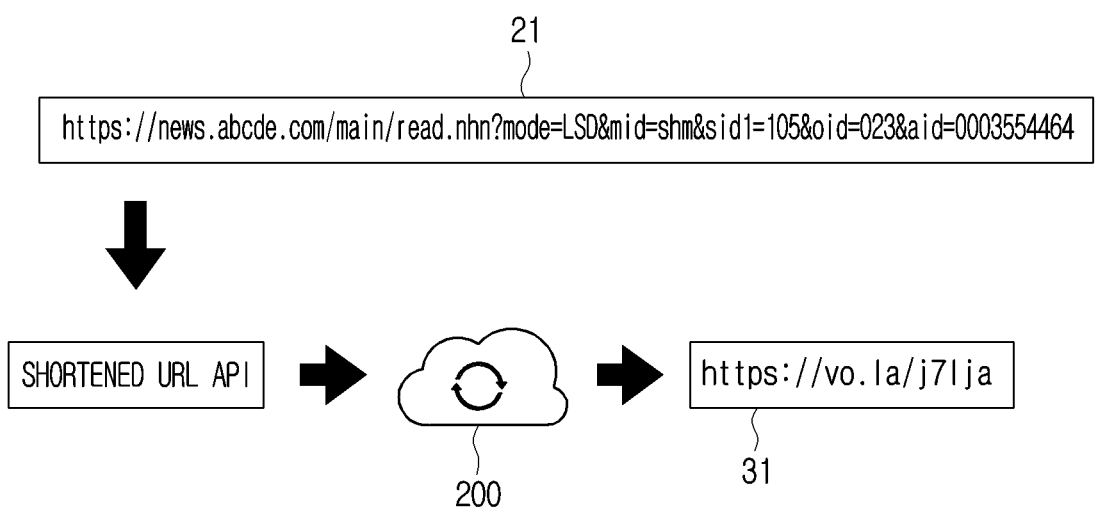
FIG. 5A is a diagram illustrating a process of generating a shortened URL according to an example.

FIG. 5A is a diagram illustrating a process of generating a shortened URL according to an example.

When the URL shortener item is selected according to the user's command, the image forming apparatus may generate a shortened URL. Referring to FIG. 5A, the image forming apparatus may identify an original URL 21 from an original document. In addition, the image forming apparatus may transmit the original URL 21 to the external apparatus 200 and receive the shortened URL 31 from the external apparatus.

Figure 5B:
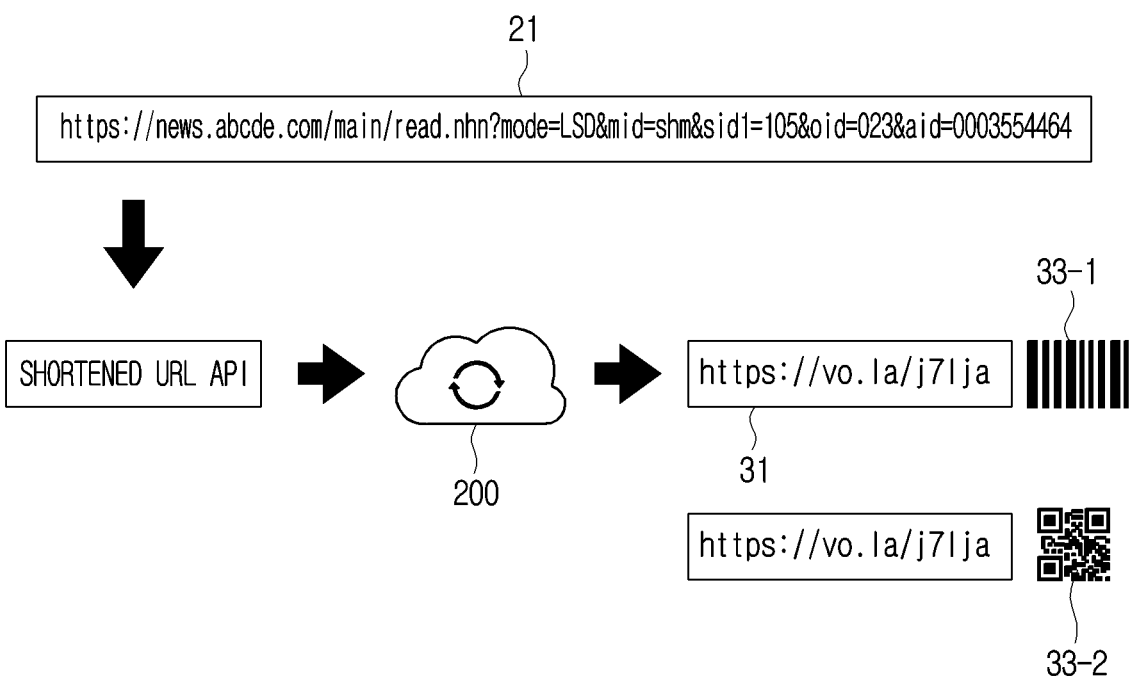
FIG. 5B is a diagram illustrating an optical recognition code corresponding to a shortened URL according to an example.

FIG. 5B is a diagram illustrating an optical recognition code corresponding to a shortened URL according to an example.

When the URL optical recognition code item is selected according to the user's command, the image forming apparatus may generate an optical recognition code. Referring to FIG. 5B, the image forming apparatus may generate the shortened URL 31 through the external apparatus 200. In addition, the image forming apparatus may generate the optical recognition code corresponding to the generated shortened URL. For example, the optical recognition code may include a barcode 33-1 or a QR code 33-2. The image forming apparatus may generate the barcode 33-1 or the QR code 33-2 corresponding to the shortened URL. In addition, the image forming apparatus may generate both the barcode 33-1 and the QR code 33-2 corresponding to the shortened URL 31.

Figure 5C:
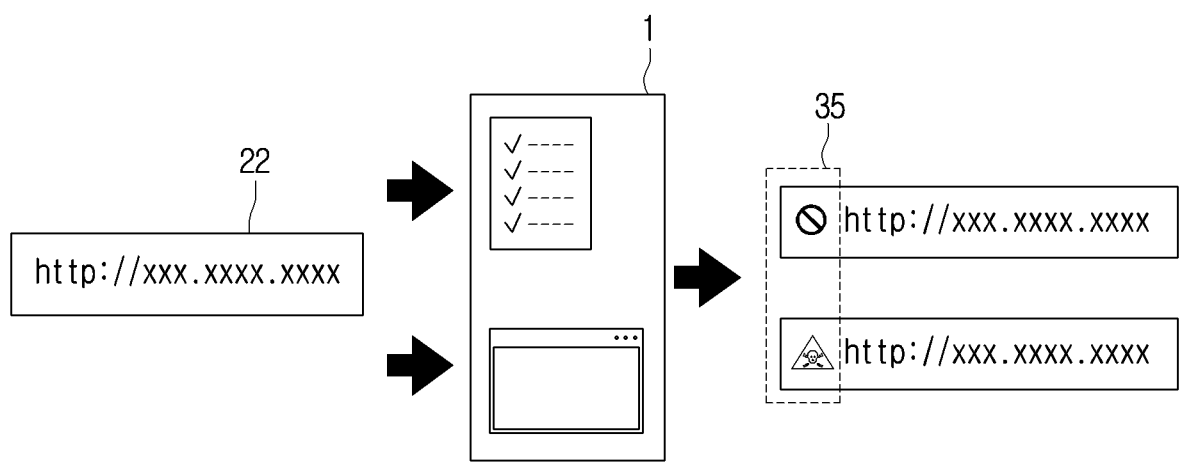
FIG. 5C is a diagram illustrating harmful information according to an example.

FIG. 5C is a diagram illustrating harmful information according to an example.

Referring to FIG. 5C, when the harmful URL check item is selected according to the user's command, the image forming apparatus may obtain harmful information. The image forming apparatus may identify the original URL 22 from the original document. The image forming apparatus may access a web page 1 corresponding to the original URL 22. The image forming apparatus may attempt to access the web page corresponding to the original URL 22 and identify the harmful information based on redirected web page information. When the harmful information is identified and the document is printed, the image forming apparatus may display a harmful URL mark 35 in an area adjacent to the URL including the harmful information on the printed document. If the original URL 22 is not changed to the shortened URL, the image forming apparatus may display the harmful URL mark 35 in an area adjacent to an area where the original URL 22 is displayed. When the original URL 22 is changed to the shortened URL, the image forming apparatus may display the harmful URL mark 35 in an area adjacent to an area where the shortened URL is displayed.

Figure 5D:
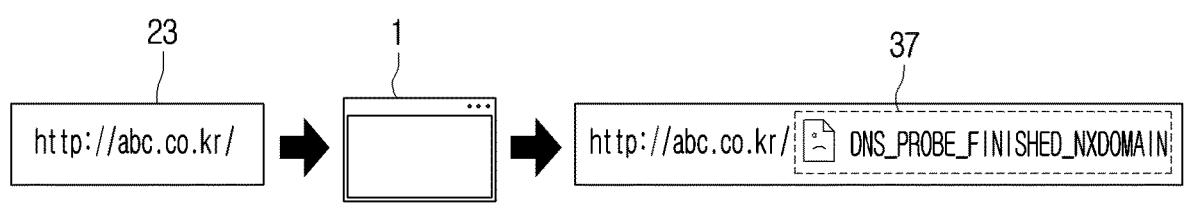
FIG. 5D is a diagram illustrating access failure information according to an example.

FIG. 5D is a diagram illustrating access failure information according to an example.

Referring to FIG. 5D, if the URL validity check item is selected according to the user's command, the image forming apparatus may obtain information indicating that it is not able to access the original URL. The image forming apparatus may identify an original URL 23 from an original document. The image forming apparatus may confirm accessibility to the web page 1 corresponding to the original URL 23. When it is confirmed that the web page 1 corresponding to the original URL 23 is not accessible and a document is printed, the image forming apparatus may display an access failure URL mark 37 in an area adjacent to the access failure URL on the printed document. If the original URL 23 is not changed to the shortened URL, the image forming apparatus may display the access failure URL mark 37 in an area adjacent to an area where the original URL 23 is displayed. When the original URL 23 is changed to the shortened URL, the image forming apparatus may display the access failure URL mark 37 in an area adjacent to an area where the shortened URL is displayed.

Figure 5E:
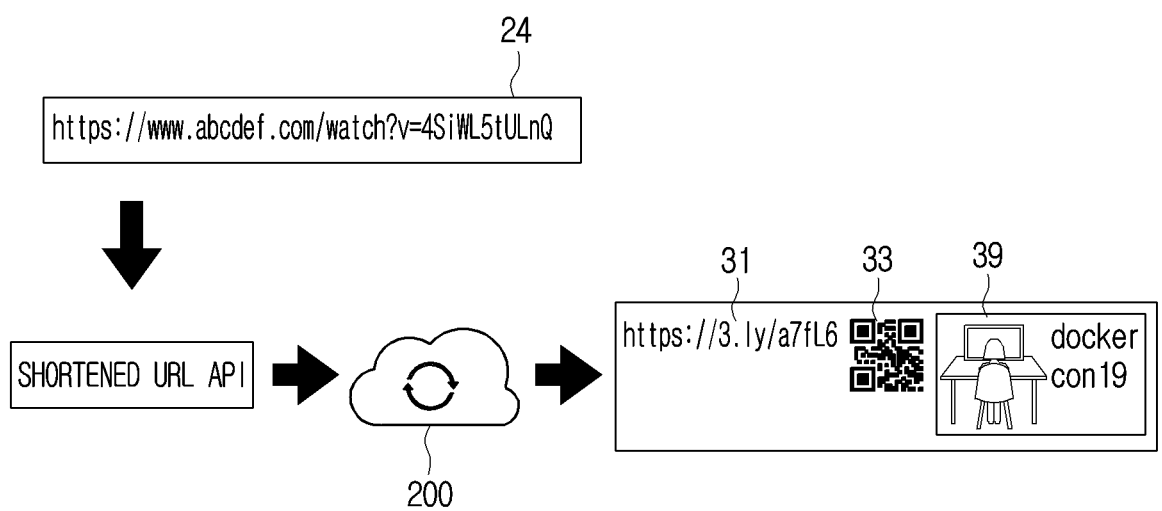
FIG. 5E is a diagram illustrating image information according to an example.

FIG. 5E is a diagram illustrating image information according to an example.

Referring to FIG. 5E, when the image URL process item is selected according to the user's command, the image forming apparatus may obtain a thumbnail image of the image information. The image forming apparatus may identify an original URL 24 from an original document. The image forming apparatus may generate the shortened URL 31 corresponding to the original URL 24 through the external apparatus 200. In addition, the image forming apparatus may generate the optical recognition code 33 corresponding to the shortened URL 31. The image forming apparatus may access a web page corresponding to the original URL 24 through the external apparatus 200. When the web page corresponding to the original URL 24 contains image information, the image forming apparatus may obtain a thumbnail image 39 of the image information. When a document is printed, the image forming apparatus may display the generated shortened URL 31, the generated optical recognition code 33, and the obtained thumbnail image 39 on a printed document.

Figure 6A:
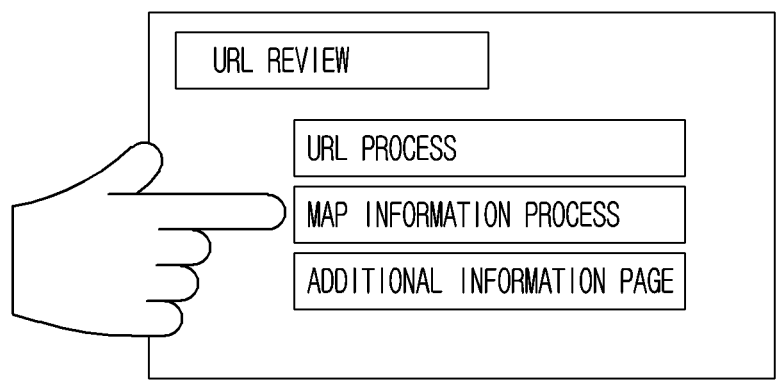
FIG. 6A is a diagram illustrating a UI for processing map information according to an example.
Figure 6B:
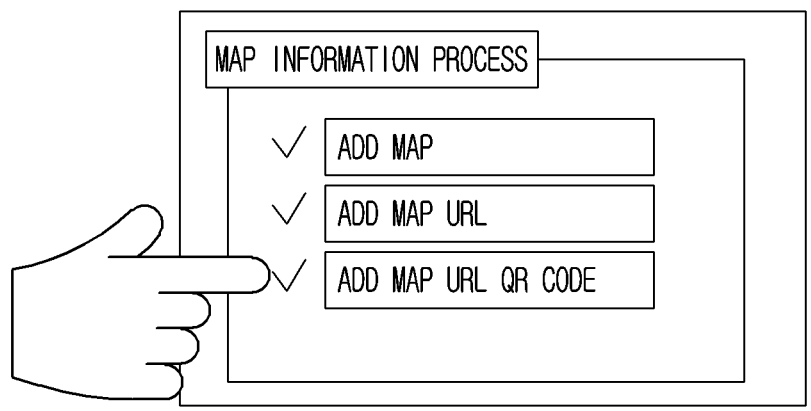
FIG. 6B is a diagram illustrating items in a map information process category according to an example.

FIG. 6A is a diagram illustrating a UI for processing map information according to an example, and FIG. 6B is a diagram illustrating items in a map information process category according to an example.

Referring to FIG. 6A, the map information process category may be selected according to the user's command. Referring to FIG. 6B, the map information process category may include a map addition item, a map URL addition item, and a map URL optical recognition code addition item. At least one item may be selected on the image forming apparatus according to the user's command. The image forming apparatus may perform an operation corresponding to the selected item.

Figure 7:
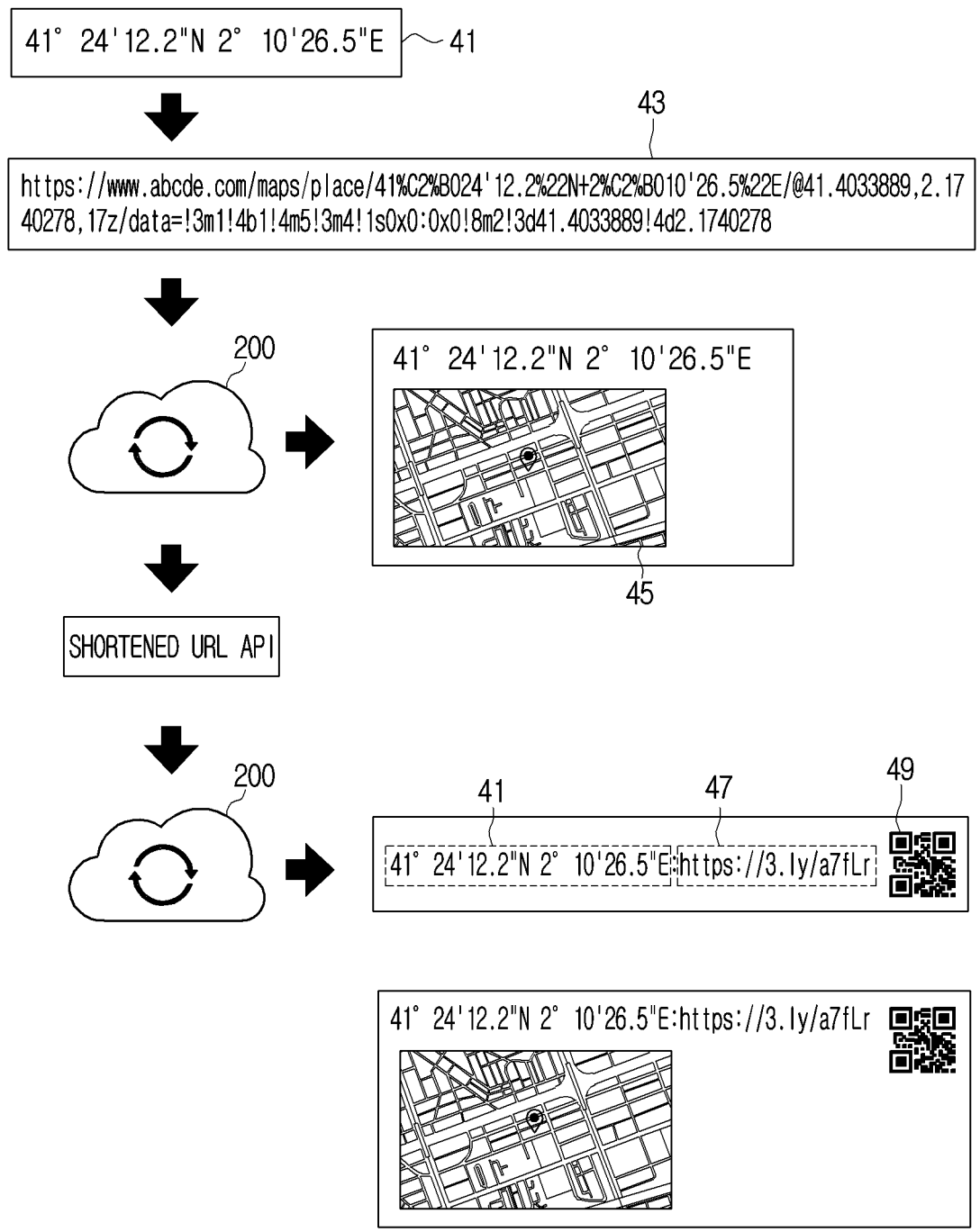
FIG. 7 is a diagram illustrating a process of processing map information according to an example.

FIG. 7 is a diagram illustrating a process of processing map information according to an example.

Referring to FIG. 7, an original URL 43 may include location information 41 on a map. The image forming apparatus may identify location information on a map contained in the original URL 43. The location information on the map may include coordinate information. When the map addition item is selected according to the user's command, the image forming apparatus may access a web page corresponding to the original URL 43 through the external apparatus 200. Since the original URL 43 contains the location information on the map, the web page corresponding to the original URL 43 may include a map image 45 containing the coordinate information. The image forming apparatus may obtain the map image 45.

In an example, the image forming apparatus may generate a shortened URL 47 from the original URL 43 through the external apparatus 200. As described above, the image forming apparatus may generate the shortened URL 47 by using the external apparatus 200. When the map URL addition item is selected according to the user's command, the image forming apparatus may display the shortened URL 47 together with the location information 41 on the map. In addition, when the map URL optical recognition code addition item is selected, the image forming apparatus may display the location information 41 on the map, the shortened URL 47, and an optical recognition code 49.

The image forming apparatus may change the original document containing the URL related to the map information to generate the PDL data and print the document based on the changed PDL data. When printing based on the changed PDL data, the image forming apparatus may print the location information 41 on the map, the shortened URL 47, the optical recognition code 49, and the map image 45, as illustrated in FIG. 7.

Figure 8A:
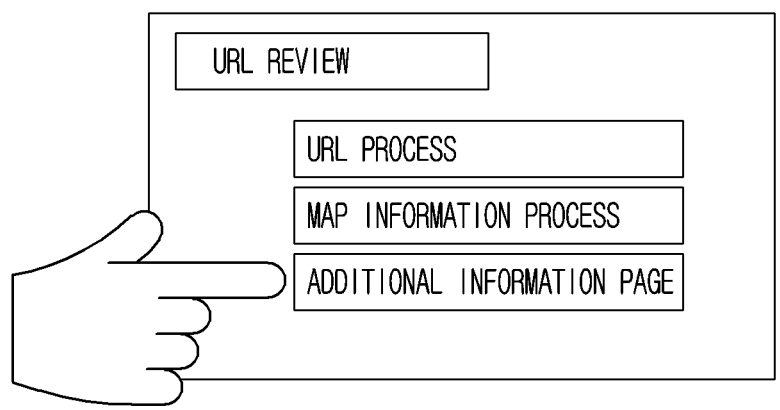
FIG. 8A is a diagram illustrating a UI for generating an additional information page according to an example.
Figure 8B:
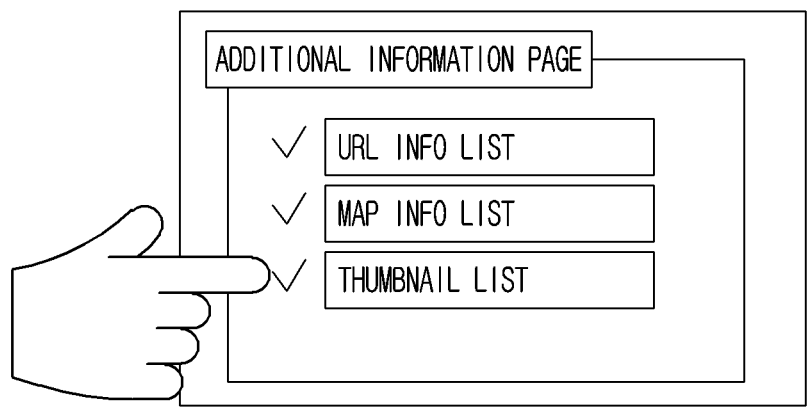
FIG. 8B is a diagram illustrating items in an additional information page category according to an example.

FIG. 8A is a diagram illustrating a UI for generating an additional information page according to an example, and FIG. 8B is a diagram illustrating items in an additional information page category according to an example.

Referring to FIG. 8A, the additional information page category may be selected according to the user's command. Referring to FIG. 8B, the additional information page category may include a URL information list item, a map information list item, and a thumbnail list item. At least one item may be selected on the image forming apparatus according to the user's command. The image forming apparatus may perform an operation corresponding to the selected item.

Figure 9:
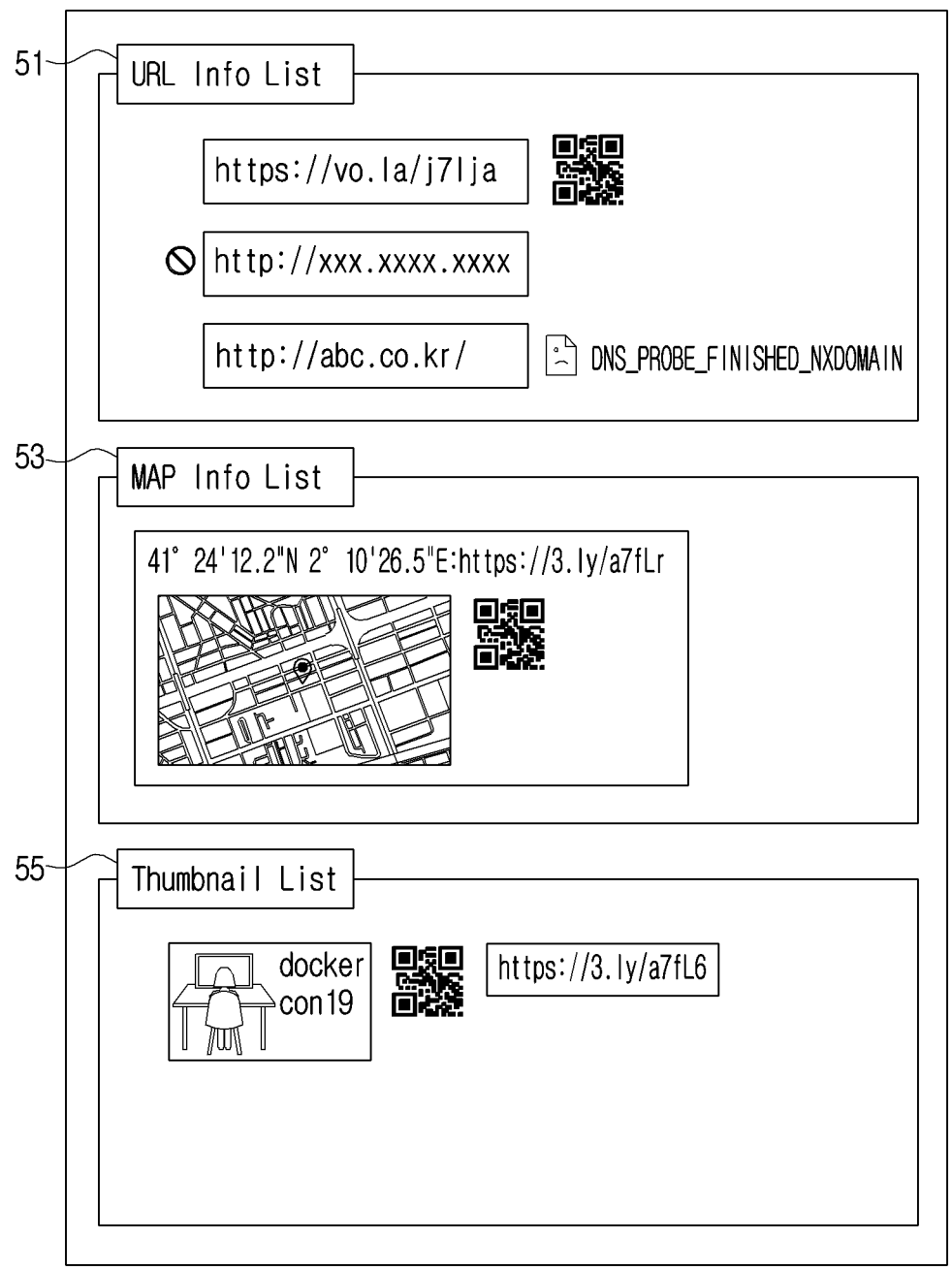
FIG. 9 is a diagram illustrating an additional information page according to an example.

FIG. 9 is a diagram illustrating an additional information page according to an example.

Referring to FIG. 9, an additional information page is illustrated. The additional information page may be a page not included in the original document. When the additional information page category is selected, the image forming apparatus may generate a separate page including additional information. In an example, the separate page including additional information may include an item selected by the user among a URL information list item, a map information list item, and a thumbnail list item.

When a URL information list item 51 is selected on the image forming apparatus, the image forming apparatus may display a shortened URL, an optical recognition code, a harmful URL mark, an access failure URL mark, and the like obtained regarding each original URL included in the original document.

When a map information list item 53 is selected, the image forming apparatus may display location information on a map, a shortened URL, an optical recognition code, a map image, and the like obtained regarding each original URL. In addition, when a thumbnail list item 55 is selected, the image forming apparatus may display a shortened URL, a generated optical recognition code, an obtained thumbnail image, and the like obtained regarding each original URL.

Figure 10:
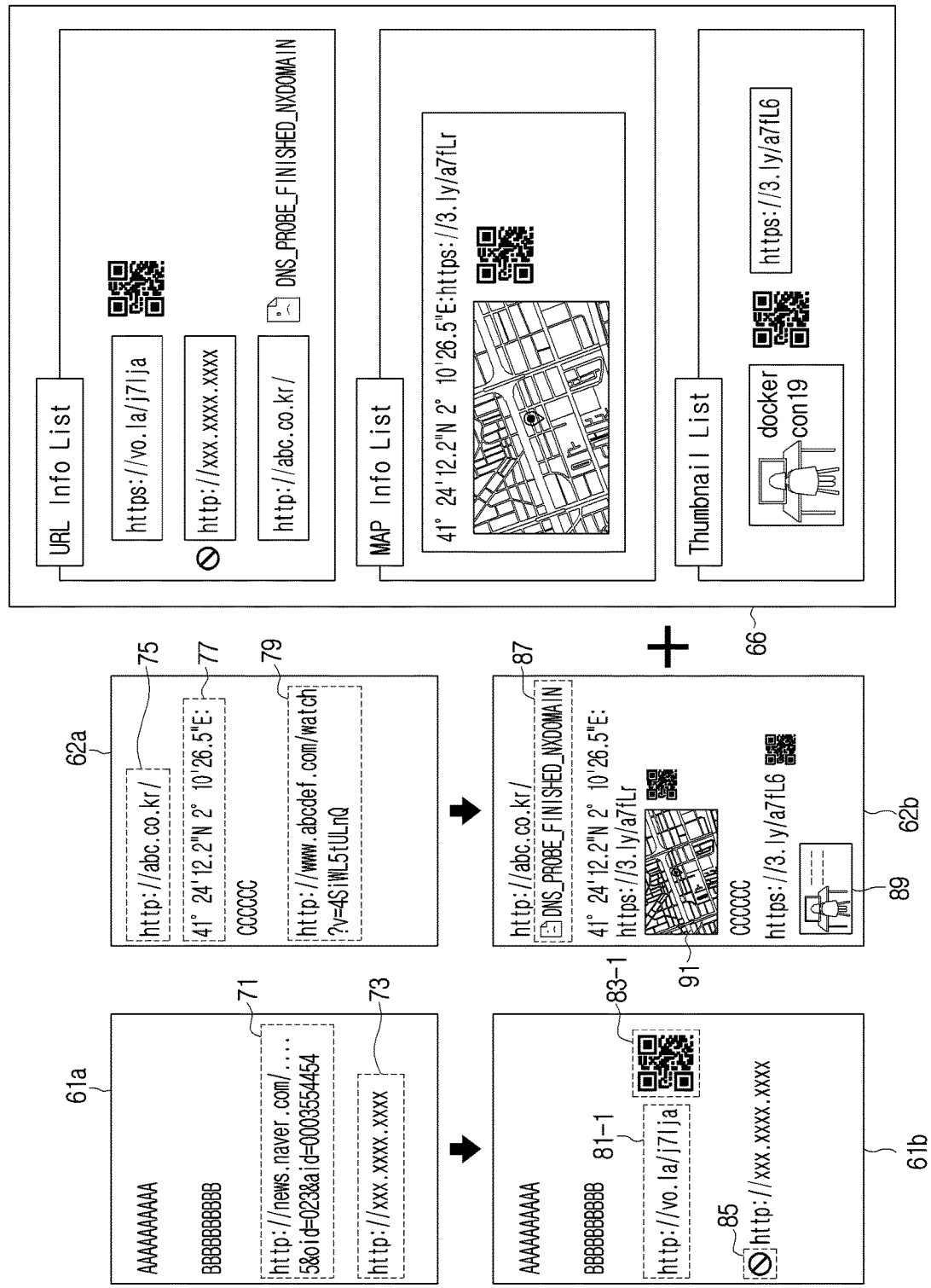
FIG. 10 is a diagram illustrating a print document generated from an original document according to an example.

FIG. 10 is a diagram illustrating a print document generated from an original document according to an example.

Referring to FIG. 10, two pages of original documents 61a and 62a are illustrated. The first page 61a of the original document may include two original URLs 71 and 73 together with a general text. The second page 62a of the original document may include three original URLs 75, 77, and 79. The image forming apparatus may generate two pages of changed documents 61b and 62b respectively changed from the two pages of original documents 61a and 62a according to the selection of the user and print the changed documents 61b and 62b.

The image forming apparatus may change the first original URL 71 included in the original document 61a of the first page to a shortened URL 81-1 and generate an optical recognition code 83-1 corresponding to the shortened URL 81-1. The image forming apparatus may obtain harmful information of a web page corresponding to the second original URL 73 included in the original document 61a of the first page and generate a harmful URL mark 85.

In addition, the image forming apparatus may confirm an access failure state of a web page corresponding to the third original URL 75 included in the original document 62a of the second page and generate an access failure URL mark 87. The image forming apparatus may identify map information corresponding to the fourth original URL 77 included in the original document 62a of the second page and obtain a map image 91. The image forming apparatus may identify image information corresponding to the fifth original URL 79 included in the original document 62a of the second page and obtain a thumbnail image 89.

The image forming apparatus may change the first page 61a of the original document including the first and second original URLs 71 and 73 to the first page 61b of the changed document and print the page. The first page 61b of the changed document may include the shortened URL 81-1 corresponding to the first original URL 71, the optical recognition code 83-1, and the harmful URL mark 85 corresponding to the second original URL 73. In addition, the image forming apparatus may change the second page 62a of the original document including the third to fifth original URLs 75, 77, and 79 to the second page 62b of the changed document and print the document. The second page 62b of the changed document may include the access failure URL mark 87 corresponding to the third original URL 75, the map image 91 corresponding to the fourth original URL 77, and the thumbnail image 89 corresponding to the fifth original URL 79.

In addition, the image forming apparatus may generate and print a separate additional information page 66 including a URL information list, a map information list, and a thumbnail list.

Figure 11:
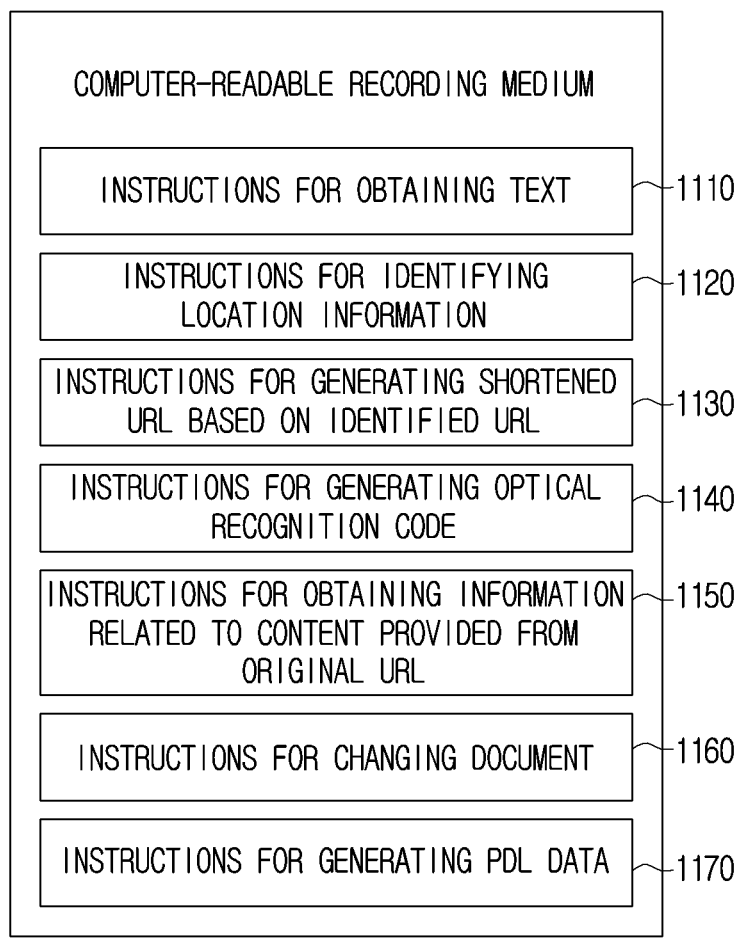
FIG. 11 is a diagram illustrating instructions stored in a non-transitory computer-readable recording medium according to an example.

FIG. 11 is a diagram illustrating instructions stored in a non-transitory computer-readable recording medium according to an example.

Referring to FIG. 11, an example URL information providing method performed on an image forming apparatus described above may be implemented in a form of a non-transitory computer-readable recording medium storing an instruction or data executable by a computer or a processor. A non-transitory computer-readable recording medium 1100 may store instructions related to the example operations of the image forming apparatus described above. For example, the non-transitory computer-readable recording medium 1100 may include instructions 1110 for obtaining a text from a document including location information, instructions 1120 for identifying the location information from the obtained text, instructions 1130 for transmitting an original URL to an external apparatus based on the identified location information, and receiving a shortened URL corresponding to the original URL from the external apparatus, instructions 1140 for generating an optical recognition code corresponding to the received shortened URL, instructions 1150 for obtaining information related to a content provided from the original URL based on the original URL, instructions 1160 for changing the document based on the shortened URL, the optical recognition code, and the information related to the content provided from the original URL, and instructions 1170 for generating the changed document as PDL data.

Such a non-transitory computer-readable recording medium may be a read-only memory (ROM), a random-access memory (RAM), a flash memory, a CD-ROM, a CD-R, a CD+R, a CD-RW, a CD+RW, a DVD-ROM, a DVD-R, a DVD+R, a DVD-RW, a DVD+RW, a DVD-RAM, a BD-ROM, a BD-R, a BD-R LTH, a BD-RE, a magnetic tape, a floppy disk, a magneto-optical data storage device, an optical data storage device, a hard disk drive, a solid-state drive (SSD), or any device capable of storing instructions or software, related data, data files, and data structures, and providing instructions or software, related data, data files, and data structures to a processor or a computer so that the processor or the computer executes the instructions.

Hereinabove, an example method for generating a shortened URL and obtaining related information to generate a changed document has been described. Hereinafter, an example of an image forming apparatus will be described.

Figure 12:
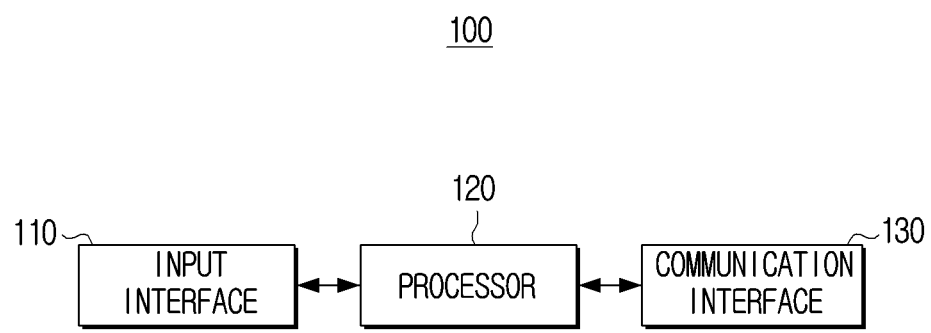
FIG. 12 is a block diagram illustrating an electronic apparatus according to an example.

FIG. 12 is a block diagram illustrating an electronic apparatus according to an example.

Referring to FIG. 12, the electronic apparatus 100 may include an input interface 110, a processor 120, and a communication interface 130. For example, the electronic apparatus 100 may be an image forming apparatus or a terminal apparatus.

The input interface 110 may receive selection of a function and a control command regarding the corresponding function from a user. For example, if the electronic apparatus 100 is the image forming apparatus, the input interface 110 may be implemented as a scanner, a paper feeder, a keyboard, a keypad, a touch screen, and the like. If the electronic apparatus 100 is the terminal apparatus, the input interface 110 may be implemented as a keyboard, a keypad, a touch screen, a mouse, a motion recognition sensor, a voice recognition sensor, and the like. The input interface 110 may be referred to as an input unit, an input module, an input device, and the like. The input interface 110 may receive an original document including location information.

The processor 120 may control an operation of the electronic apparatus 100. The processor 120 may obtain a text from the original document by using the OCR technology. In addition, the processor 120 may identify the location information from the obtained text, and generate a shortened URL based on the original URL corresponding to the identified location information. For example, the processor 120 may transmit the original URL to the external apparatus via the communication interface 130 and receive the shortened URL generated on the external apparatus via the communication interface 130. The shortened URL may have a set valid period to be accessed.

The processor 120 may generate an optical recognition code corresponding to the generated shortened URL. For example, the optical recognition code may include a barcode and a QR code. The processor 120 may obtain information related to a content provided from the original URL from the external apparatus based on the original URL. For example, the processor 120 may access a web page of the original URL via the external apparatus. If the original URL is linked to map information, the processor 120 may obtain a map image including the location information. If the original URL is linked to image information, the processor 120 may obtain a thumbnail image of the image information. If the original URL is linked to harmful information, the processor 120 may obtain the harmful information and generate a harmful URL mark. If it is not able to access the original URL, the processor 120 may obtain access failure information and generate an access failure URL mark.

The processor 120 may generate a changed document that is changed from the original document based on the shortened URL, the optical recognition code, and the information related to the content provided from the original URL. The processor 120 may change the original URL to the shortened URL, and add the optical recognition code, the obtained information related to the content, and the like in an area adjacent to the shortened URL. In addition, the processor 120 may generate the changed document as PDL data. For example, if the electronic apparatus 100 is the terminal apparatus, the processor 120 may transmit the PDL data to the image forming apparatus via the communication interface 130.

The communication interface 130 may communicate with the external apparatus. For example, the external apparatus may include a server, a cloud, a web server, a host apparatus, and the like. The communication interface 130 may be formed to connect the electronic apparatus 100 to the external apparatus and may be connected via a universal serial bus (USB) port or a wireless communication (e.g., Wi-Fi 802.11a/b/g/n, near field communication (NFC), or Bluetooth) port, in addition to the connection to the external apparatus via a local area network (LAN) or the Internet. The communication interface 130 may be referred to as a communicator, a communication module, a communication device, or a transceiver.

Figure 13:
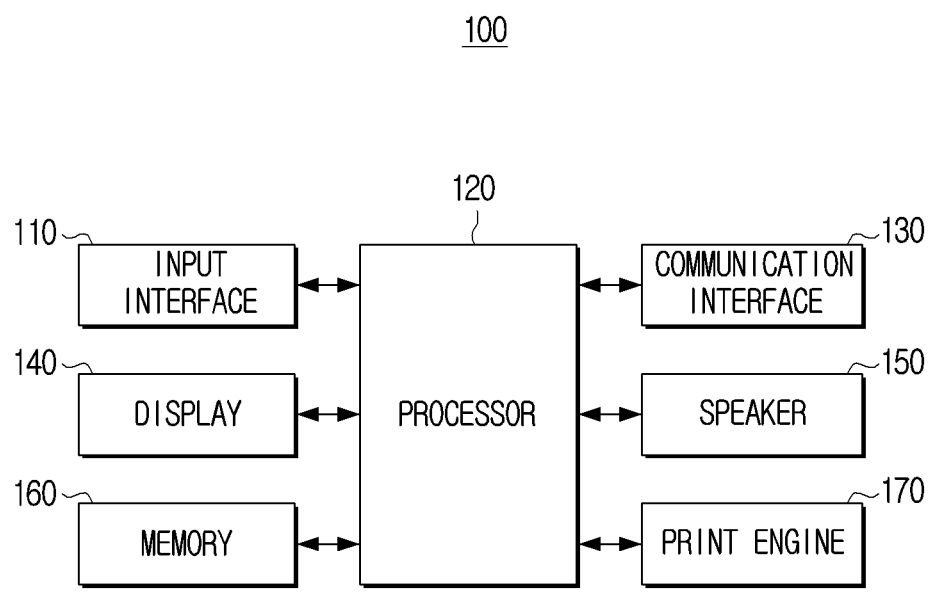
FIG. 13 is a block diagram illustrating an electronic apparatus according to an example.

FIG. 13 is a block diagram illustrating an electronic apparatus according to an example.

Referring to FIG. 13, the electronic apparatus 100 may include the input interface 110, the processor 120, the communication interface 130, a display 140, a speaker 150, a memory 160, and a print engine 170.

The input interface 110 and the communication interface 130 perform the same functions as the input interface 110 and the communication interface 130 of FIG. 12, and therefore the overlapped description will not be repeated. In addition, the processor 120 performs similar functions as the processor 120 of FIG. 12, and therefore the description in FIG. 12 will not be repeated, and contents related to elements added in FIG. 13 will be described hereinafter.

The display 140 may display an execution screen and a user interface window of an application program. In an example, the display 140 may display a UI for processing a URL. For example, the UI for processing the URL may include a URL processing category, a map information processing category, an additional information page category, and the like. Each category may include at least one item.

The display 140 may be implemented as a liquid crystal display (LCD), a cathode ray tube (CRT), a light emitting diode (LED), an organic LED (OLED), or a flexible display, and may also be implemented as a touch screen for simultaneously performing the function of the input interface 110.

The speaker 150 may output state information of the electronic apparatus 100 as a sound. For example, if the electronic apparatus 100 is in an error state, the speaker 150 may output a sound corresponding to the error state. In addition, the speaker 150 may output voice data converted into a voice or voice data in an audio format.

The memory 160 may store at least one instruction regarding the electronic apparatus 100. For example, the memory 160 may store various programs (or software) for the electronic apparatus 100 to operate according to various examples of the disclosure. For example, the memory 160 may store each module which is software for performing each function of the disclosure. Each module stored in the memory 160 may be loaded to the processor 120 to perform the function.

If the electronic apparatus 100 is the image forming apparatus, the electronic apparatus 100 may include the print engine 170. The print engine 170 may form an image. In an example, the print engine 170 may print a print image generated on the processor 120 on a printing medium such as paper. The print engine 170 may perform printing by electrophotography, an ink jet method, and the like. In addition, the print engine 170 may be a monochrome print engine capable of printing only one color or may be a color print engine for color printing. The print engine 170 may print the shortened URL, the optical recognition code, the additional information page, and the like.

Figure 14:
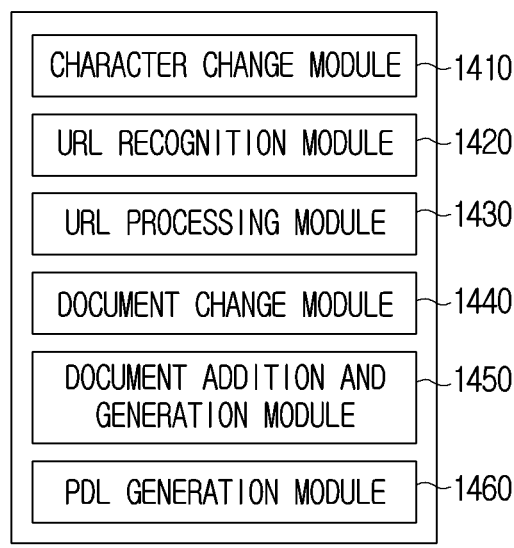
FIG. 14 is a block diagram illustrating a processor according to an example.

FIG. 14 is a block diagram illustrating a processor according to an example.

Referring to FIG. 14, a processor 1400 may include a character conversion module 1410, a URL recognition module 1420, a URL processing module 1430, a document change module 1440, a document addition and generation module 1450, and a PDL generation module 1460. Each module may be stored in a memory. In addition, the processor 1400 may load a module necessary for executing each function.

The character conversion module 1410 may extract a text from the original document by using OCR technology. The URL recognition module 1420 may identify information of a URL type and coordinate information on a map from the extracted text. The URL processing module 1430 may generate a shortened URL from the identified URL via the external apparatus. In addition, the URL processing module 1430 may generate an optical recognition code and obtain harmful information and access failure information. Further, the URL processing module 1430 may obtain a map image and a thumbnail image. The document change module 1440 may change the original document based on the data generated or obtained by the URL processing module 1430. The document addition and generation module 1450 may generate an additional information page based on the data generated or obtained by the URL processing module 1430. The PDL generation module 1460 may generate the changed document as the PDL data.

While examples of the disclosure have been shown and described, the disclosure is not limited to the aforementioned examples, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. A uniform resource locator (URL) information providing method comprising:
   obtaining a text from a document including location information and identifying the location information;
   transmitting an original URL corresponding to the identified location information to an external apparatus and receiving a shortened URL corresponding to the original URL;
   generating an optical recognition code corresponding to the received shortened URL and obtaining information related to a content provided from the original URL from the external apparatus based on the original URL;
   changing the document based on the shortened URL, the optical recognition code, and the information related to the content provided from the original URL; and
   generating the changed document as page description language data.

2. The method according to claim 1, wherein the obtaining of the information related to the content provided from the original URL comprises, based on the original URL being linked to map information, obtaining a map image including the location information.

3. The method according to claim 1, wherein the obtaining of the information related to the content provided from the original URL comprises, based on the original URL being linked to image information, obtaining a thumbnail image of the image information.

4. The method according to claim 1, wherein the obtaining of the information related to the content provided from the original URL comprises, based on the original URL being linked to harmful information, obtaining the harmful information.

5. The method according to claim 1, wherein the obtaining of the information related to the content provided from the original URL comprises, based on the original URL not able to be accessed, obtaining access failure information.

6. The method according to claim 1, wherein the changing of the document comprises, changing the original URL to the shortened URL and adding at least one of the optical recognition code or the obtained information related to the content in an area adjacent to the shortened URL.

7. The method according to claim 1, further comprising:
   adding a separate page including the shortened URL, the optical recognition code, and the obtained information related to the content to the document.

8. The method according to claim 1, wherein the shortened URL includes a set valid period to be accessed.

9. The method according to claim 1, wherein the location information comprises address information of a web page or coordinate information of a map.

10. The method according to claim 1, wherein the optical recognition code comprises a barcode or a quick response code.

11. An electronic apparatus comprising:
   an input interface to receive a document including location information;
   a communication interface to communicate with an external apparatus; and
   a processor to:
      obtain a text from the document,
      identify the location information from the obtained text,
      transmit an original uniform resource locator (URL) corresponding to the identified location information to an external apparatus via the communication interface,
      receive a shortened URL corresponding to the original URL from the external apparatus,
      generate an optical recognition code corresponding to the received shortened URL,
      obtain information related to a content provided from the original URL from the external apparatus based on the original URL,
      change the document based on the shortened URL, the optical recognition code, and the information related to the content provided from the original URL, and
      generate the changed document as PDL data.

12. The apparatus according to claim 11, wherein the processor is to:

based on the original URL being linked to map information, obtain a map image including the location information, based on the original URL being linked to image information, obtain a thumbnail image of the image information, based on the original URL being linked to harmful information, obtain the harmful information, or based on the original URL not able to be accessed, obtain access failure information.

13. The apparatus according to claim 11, wherein the processor is to change the original URL to the shortened URL and add the optical recognition code or the obtained information related to the content in an area adjacent to the shortened URL.

14. The apparatus according to claim 11, wherein the shortened URL includes a set valid period to be accessed.

15. A non-transitory computer-readable recording medium recording a program for performing a uniform resource locator (URL) information providing method, the recording medium comprising:

instructions to obtain a text from a document including location information;

instructions to identify the location information from the obtained text;

instructions to transmit an original URL to an external apparatus based on the identified location information and receive a shortened URL corresponding to the original URL from the external apparatus;

instructions to generate an optical recognition code corresponding to the received shortened URL;

instructions to obtain information related to a content provided from the original URL based on the original URL;

instructions to change the document based on the shortened URL, the optical recognition code, and the information related to the content provided from the original URL; and instructions to generate the changed document as PDL data.

* * * * *